United States Patent

[11] 3,610,184

[72] Inventors William J. Carroll
West Lafayette, Ind.;
Frank S. Mizusawa, Garden Grove, Calif.
[21] Appl. No. 879,871
[22] Filed Nov. 25, 1969
[45] Patented Oct. 5, 1971
[73] Assignee Great Lakes Chemical Corporation
West Lafayette, Ind.

[54] APPARATUS FOR DEPOSITION OF LIQUID BELOW THE SURFACE OF THE EARTH
4 Claims, 5 Drawing Figs.
[52] U.S. Cl. .................................................. 111/7,
172/176
[51] Int. Cl. .................................................. A01b 49/06,
A01c 23/02
[50] Field of Search ........................................ 111/6, 7, 1;
47/58; 172/176

[56]  References Cited
UNITED STATES PATENTS

| | | | |
|---|---|---|---|
| 3,148,642 | 9/1964 | Gould............................ | 111/7 |
| 3,303,799 | 2/1967 | Britt.............................. | 111/6 |
| 3,316,865 | 5/1967 | Williams........................ | 11/6 |
| 3,442,221 | 5/1969 | Phillips et al. ................ | 111/7 X |

Primary Examiner—Robert E. Bagwill
Attorneys—Gordon W. Hueschen and A. David Spevack ABSTRACT: An apparatus for depositing a gelled liquid below the surface of the soil having a plurality of earth-penetrating tools each having a gelled liquid depositing conduit and a bypass conduit attached to the rearward side of the tools terminating below the soil surface. A series of pipes and valves connect containers of gelled liquid, water and inert gas under pressure to the conduits and are positioned so as to withdraw a gel obstruction from a depositing conduit, with a venturilike sucking action by passing water through the bypass line associated herewith, thereby depositing the withdrawn obstruction below the soil surface.

INVENTORS
WILLIAM J. CARROLL
FRANK S. MIZUSAWA

INVENTORS
WILLIAM J. CARROLL
FRANK S. MIZUSAWA

INVENTORS
WILLIAM J. CARROLL
FRANK S. MIZUSAWA

BY

ATTORNEY

INVENTORS
WILLIAM J. CARROLL
FRANK S. MIZUSAWA

BY

ATTORNEY

APPARATUS FOR DEPOSITION OF LIQUID BELOW THE SURFACE OF THE EARTH

BACKGROUND OF THE INVENTION

This invention relates to agricultural or earthworking apparatus used to deposit a liquid or gas below the soil surface. More particularly, it relates to an apparatus for the continuous deposition of a gelled liquid, such as gelled fumigant methyl bromide and the like, below the surface of the soil.

Fumigants are applied to the soil to control nematodes, soil-borne insects, larvae, weeds, weed seeds and fungus. Several methods have been used to place a liquid or gas, such as sulfur dioxide, anhydrous ammonia, herbicides, insecticides, and liquid fertilizers below the surface of the soil. U.S. Pat. Nos. 3,326,152; 3,259,087 and 3,146,740 disclose earth-penetrating tools having means for depositing a liquid or gas into the soil by the use of a single tube or conduit mounted rearwardly and adjacent to the earth-penetrating tool. While these tools are suitable for use with some agricultural chemicals, unsatisfactory results were obtained when a gelled gaseous fumigant was used.

Fumigants in gell form have been used in conventional equipment, generally with unsatisfactory results. Due to the physical properties of the gel, conventional equipment often became clogged. The tool would then have to be removed from the earth while the obstruction was cleared. During this procedure, quantities of gel were exhausted to the soil surface and the surrounding air thereby causing the equipment operator to be exposed to dangerous fumes. Each time the distributing equipment became clogged, the forward motion of the tractor or other means used for transportation had to be stopped, and the tool lifted from the soil, thereby disrupting the continuous application of gel fumigant.

OBJECTS OF THE INVENTION

It is an object of the present invention to provide an apparatus for the continuous deposition of gelled liquids, gel fumigants and mixtures thereof below the surface of the soil.

Another object is the provision of a wash-and-purge system which readily removes gel fumigant from the underground tool and connecting lines when they become clogged.

Another object is to provide means for mounting a plurality of earthworking tools so that they are laterally adjustable to suit the individual requirements of the user.

Another object is to provide means for mounting the gel fumigant deposition apparatus on a farm tractor in a manner such that it can be controlled by one operator as he directs the forward motion of said tractor through the field to be treated.

Another object of the invention is the provision of an apparatus which shapes the earth over which the equipment has passed into mounds, and into beds and compacts these mounds.

Other objects will be apparent to those skilled in the art to which this invention pertains.

SUMMARY OF THE INVENTION

According to this invention, there is provided an apparatus for depositing a gelled liquid under pressure into the soil through depositing conduits mounted rearwardly on a plurality of earthworking tools and having clearing means comprising bypass conduits, also mounted rearwardly on said tools, connected through valves to said depositing conduits and to a source of water under pressure, in such a manner that removing the pressure from a clogged depositing conduit, passing water through the bypass conduits connected thereto and opening the valve therebetween causes the obstruction to be drawn up the depositing conduit and flushed down the bypass conduit into the soil.

BRIEF DESCRIPTION OF THE INVENTION

The major elements of the apparatus are attached to a common mounting member. Several earth-penetrating tools are adjustably attached to the tool bar. Attached to each earth-penetrating tool are two conduits, one of which is a liquid-depositing conduit and the other a bypass conduit, both terminating below the surface of the soil when the unit is in operation. A water container, a gelled liquid container and a container for pressurized gas are connected to these conduits by a series of pipes, valves and a common manifold. The common manifold is supplied with gelled liquid when the apparatus is in operation and with water when a conduit is being cleared. Each are pressurized with the inert gas. For each earth-penetrating tool, there is a liquid supply line which leads from the manifold to a shutoff valve and then to a restriction or orifice in the line and then to the gelled liquid depositing conduit. This line has a transparent sight means therein or is made of clear translucent plastic material, such as polyethylene, so that flow of the gelled liquid therein may be monitored. Upstream from the orifice, but downstream from the valve in the line is a bypass line having a shutoff valve therein. When the unit is in operation and the gelled liquid depositing line becomes clogged, as evidenced by an interruption in the flow of gel therein, the shutoff valve in the bypass line is opened, creating a venturi effect which sucks the clogged gel from the gelled liquid depositing line into the bypass line. This liquid is then exhausted out the bypass conduit with the flushing water and deposited in the soil. This procedure is also used to clear the lines at the end of the day's operations.

Gases and other liquids under pressure can also be used to clear clogged lines. The lines can be cleared of the flushing liquid by purging with the pressurized inert gas.

The earth-leveling member can be adjusted and modified to form the surface of the soil in several different patterns. A smooth surface, mounded beds and rounded beds can be produced, depending on the attachments selected. If a mounded or rounded bed is desired, the soil may be prepared for planting by the use of a bed roller in conjunction with the bed shaper, thereby reducing the number of steps required to place the field in a final condition for planting.

DETAILED DESCRIPTION OF THE INVENTION

Figure 1:
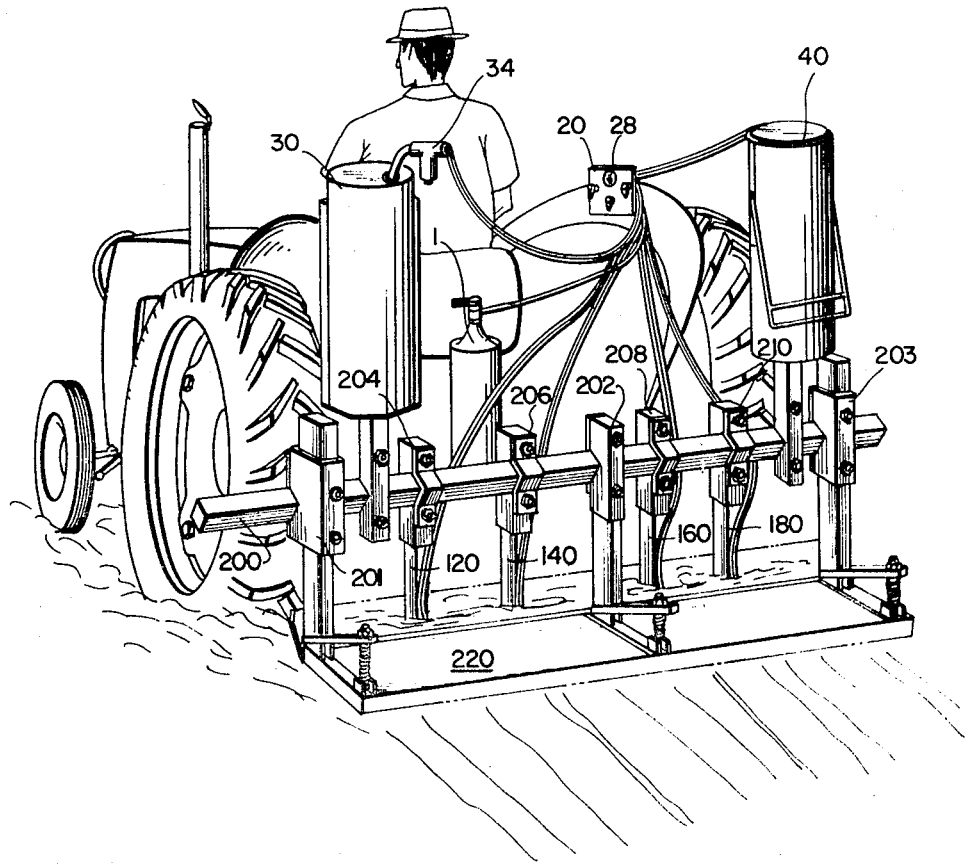
FIG. 1 is a perspective view of the apparatus according to the invention mounted on a farm tractor.
Figure 2:
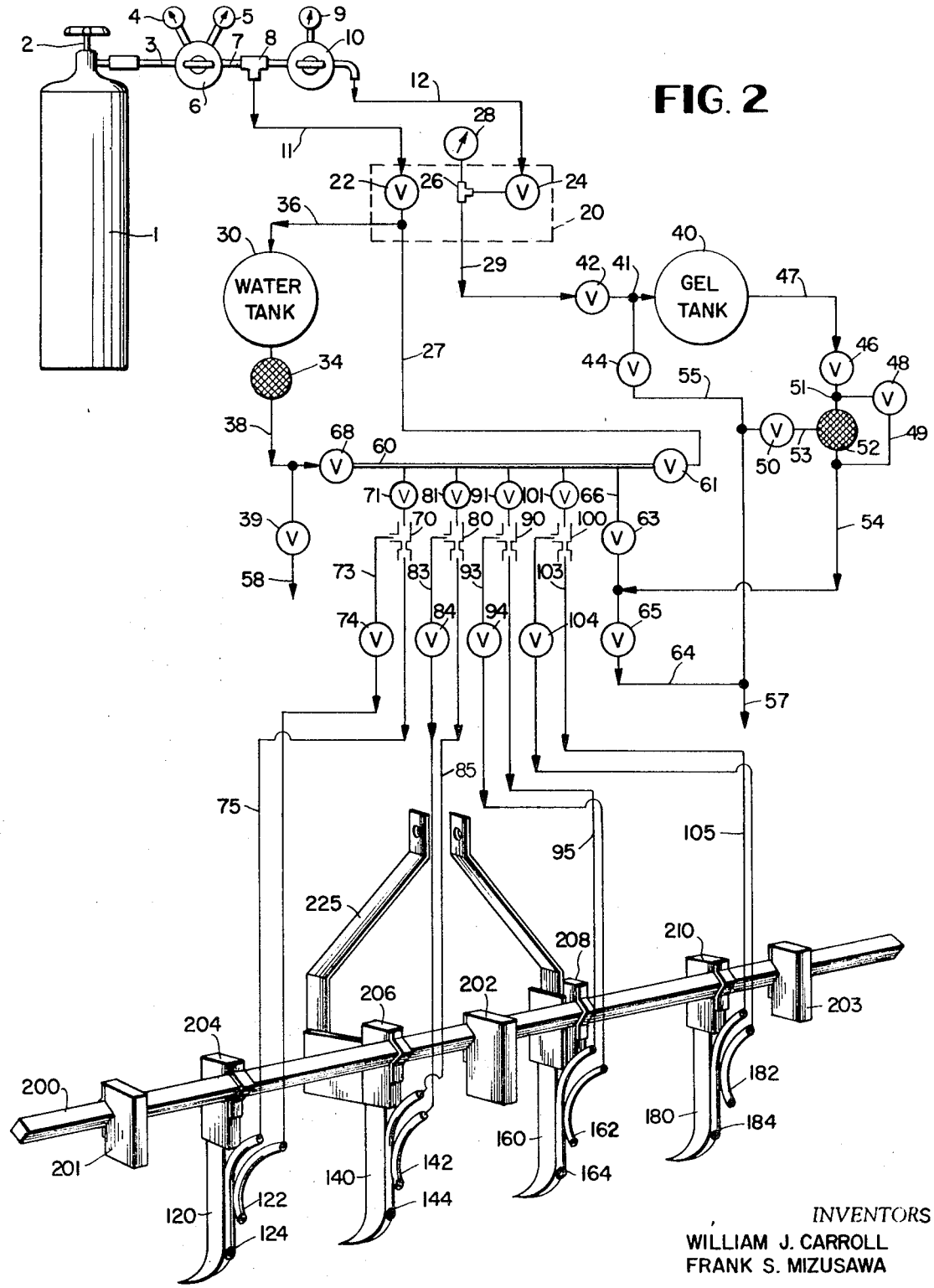
FIG. 2 is a schematic diagram of the paths of the gas and fluids through the system with the gas cylinder, the earth-penetrating tools and the terminal ends of the fumigant conduits attached thereto in perspective.

In the embodiment shown in FIGS. 1 and 2, inert gas container 1 is fitted with pressure regulators 6 and 10 in series and lines therefrom. Master control 20 links inert gas container 1 to water tank 30 and gel tank 40. Tool bar 200 has earth-working tools 120, 140, 160 and 180 mounted thereon. The downstream ends 124, 144, 164 and 184 of distribution conduits 75, 85, 95 and 105 are mounted rearwardly and carried by earth-working tools 120, 140, 160 and 180, respectively, as are ends 122, 142, 162, and 182 of shorter bypass conduits 73, 83, 93 and 103. Pipes 11 and 27, pipe 38 and pipes 47 and 54 connect manifold 60 with gas tank 1, water tank 30 and gel tank 40, respectively. Eliminating downstream from manifold 60 are distribution conduits 75, 85, 95 and 105 which have shutoff valves 71, 81, 91 and 101, respectively, therein and orifice 70, 80, 90 and 100, respectively, therein which restrict the flow of fluid therein. Bypass lines 73, 83, 93 and 103, which originate upstream from orifice 70, 80, 90 and 100, have shutoff valves 74, 84, 94 74, 84, 104 therein. Preferred embodiment valves 71, 81, 91, 101, 74, 84 94 and 104 are those described in U.S. Pat. No. 2,929,406.

In the inert gas container assembly, gas tank 1 fitted with valve 2, is connected by line 3 to a pressure regulator 6 containing pressure gauges 4 and 5. Line 7 leads to T-fitting 8, one leg of which leads to pressure regulator 10 having gauge 9 thereon and then through pipe 12 to valve 24 of master control 20. The other leg leads through line 11 to valve 22 of master control 20.

In the master control 20, valve 24 is connected through T-fitting 26 to pressure gauge 28 and to line 29, which leads to the gel tank assembly. Valve 22 of master control 20 connects line 11 with line 36, which leads to the water tank assembly, and line 27, which leads to valve 61 in manifold 60.

In the gel tank assembly, valve 42 connects line 29 with T-fitting 41, one leg of which leads to gel tank 40 and the other to discharge line 55, having a shutoff valve 44 therein; which terminates in a discharge pipe 57. Line 47 leads from gel tank 40 to a strainer and bypass assembly which consists of a shutoff valve 46 which leads to a T-fitting 51, one leg of which leads to tee 51, strainer 52 mounted in exit line 54 and the other leg to a shutoff valve 48 in line 49, which connects below strainer 52 to exit line 54. Strainer 52 is connected to bypass pipe 53, having a shutoff valve 50 therein, which is connected to discharge line 55.

Valve 48 and line 49 provide a bypass for strainer 52 should it become clogged. Valve 65 and line 64 provide an alternate exhaust route for gel that is to be vented below the soil surface.

In the preferred embodiment, the inert pressurized gas is nitrogen and the gelled liquid is methyl bromide gel, a fumigant.

In the water tank assembly, line 36 leads from valve 22 to water tank 30, which is connected by line 38 to discharge line 58 having a shutoff valve 39 therein and to manifold 60 through shutoff valve 68.

Manifold 60 is supplied with pressurized gas from the inert gas container assembly by line 27 connected thereto by shutoff valves 22 and 61.

Water is supplied to manifold 60 by line 38 connected thereto through shutoff valve 68. Gelled liquid is supplied thereto by line 54 connected thereto through shutoff valve 63 and line 66. Downstream from manifold 60 are shutoff valves 71, 81, 91 and 101, in lines 78, 88, 98 and 108, respectively.

As shown in FIG. 1, apparatus of this invention is attached to a farm tractor fitted with a three-point hitch (not shown). Master control 20 is mounted on the tractor fender so that the operator can easily monitor gauge 28 which measures the pressure in gel tank 40. Tool bar 200 is attached to the tractor's three-point hitch (not shown) and serves as the common mounting member for earthworking tools 120, 140, 160 and 180 attached by mounting brackets 204, 206, 208 and 210 respectively; bed support members 201, 202 and 203; water tank 30 and gel tank 40. Pressurized inert gas tank 1 can be mounted any place on the tractor or on the tool bar 200, preferably near master control 20. Ground-leveling member 220 is attached to tool bar 200 by mounting brackets 201, 202 and 203.

Figure 3:
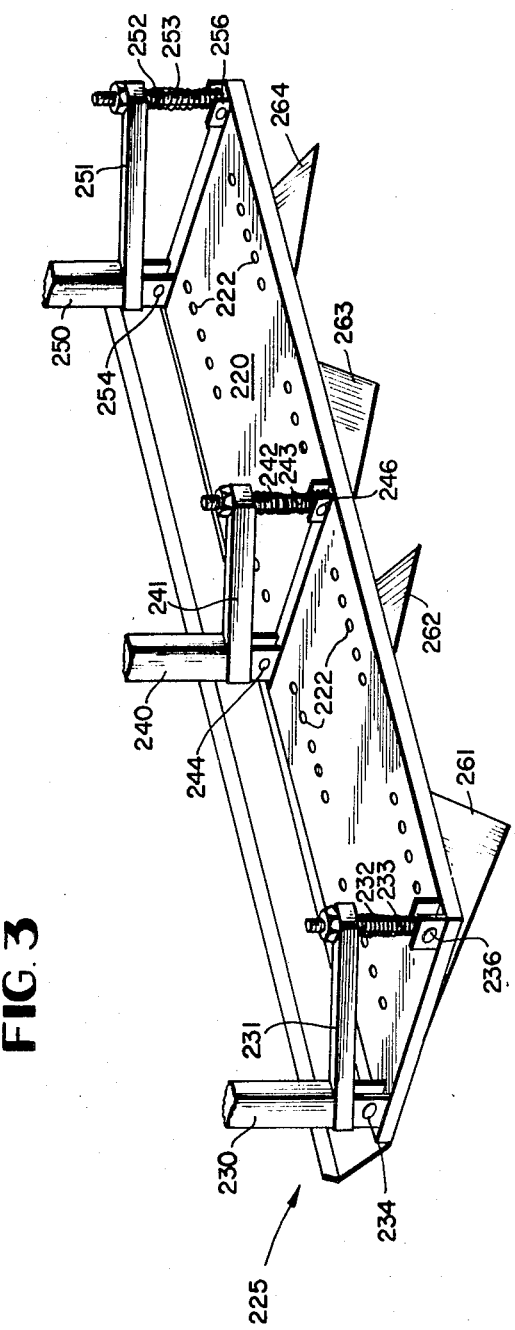
FIG. 3 is a detailed perspective view of the bed shaper used in conjunction with the gelled liquid depositing apparatus.

As shown in FIG. 3, on tool bar 200 is mounted on three-point hitch 225. Also mounted thereon, as shown in FIGS. 1 and 2, are earth-shaper supports 201, 202, and 203 and tool-mounting supports 204, 206, 208 and 210. Earthworking tools 120, 140, 160 and 180 are attached to their respective supports 204, 206, 208 and 210.

Ground leveler 220 is adapted to form the soil into beds or mounds as the leveler passes over the surface of the soil. Ground leveler 220 is adjustably attached to the mounting brackets (not shown) by supports 230, 240 and 250. Fixed arms 231, 241 and 251 are attached to their respective supports 230, 240, and 250 and adjustably attached to the rearward edge of bed shaper 220 by bolt 232, 242 and 252 and flexible joint 236, 246 and 256 with spring 233, 243 and 253 disposed therebetween. Supports 230, 240 and 250 are pivotally attached near lading edge 225 of ground leveler 220 at joints 234, 244 and 254. Leading edge 225 is positioned upward from the plane of ground leveler 220. Bed-shaping plates 261, 262, 263 and 264 are mounted in pairs on the underside of and perpendicular to ground leveler 220. These fins or bed-shaping plates are bolted to the ground leveler 220 through holes 222.

Figure 4:
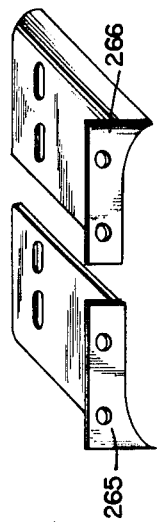
FIG. 4 is a detailed perspective view of an alternative bed-shaping attachments that can be adjustably mounted to the underside of the bed shaper of FIG. 3.

The bed-shaping plates 265 and 266 shown in FIG. 4 are alternatives to plates 261 and 262 shown in FIG. 3. They have rounded edges 300, which form a rounded bed rather than an angular bed.

Figure 5:
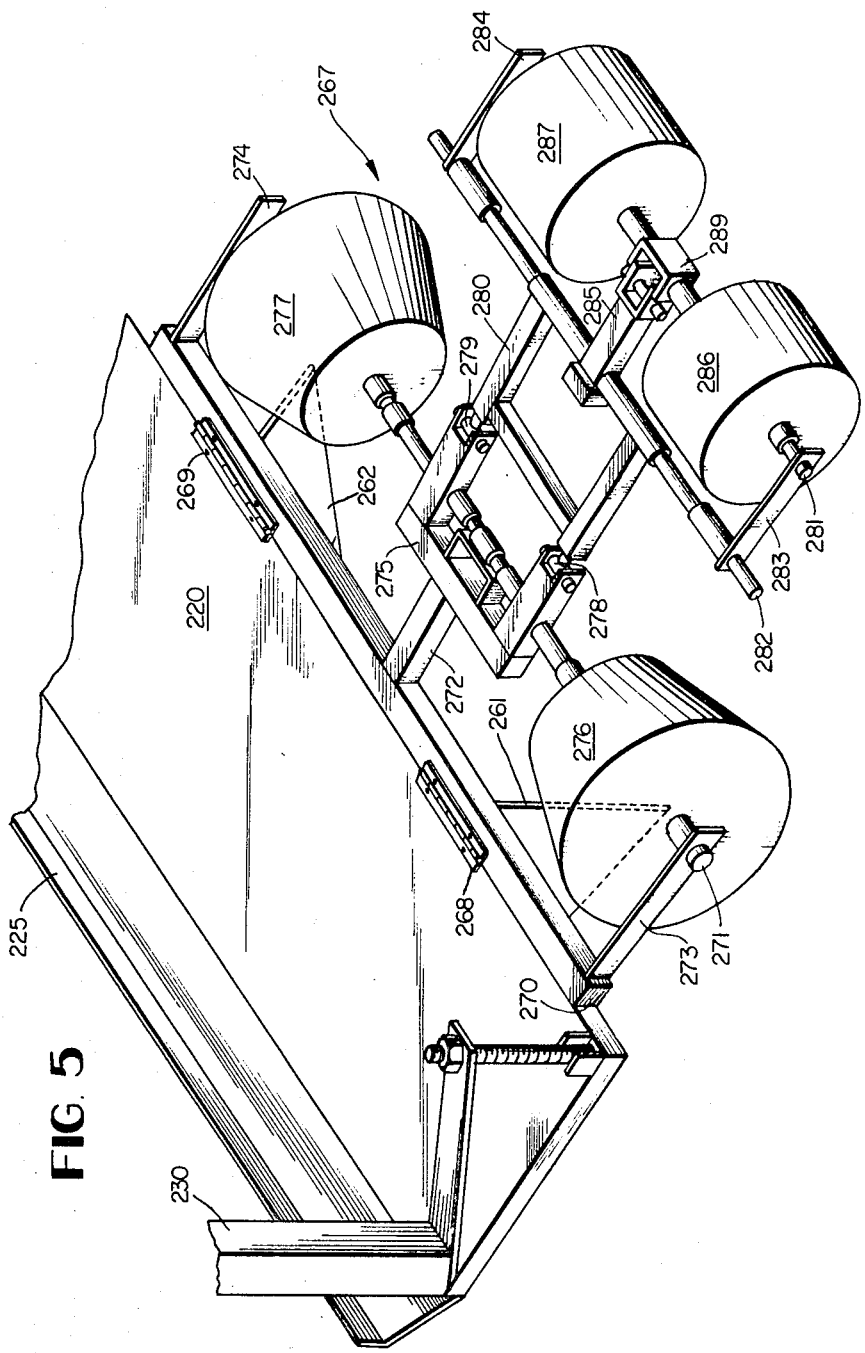
FIG. 5 is a perspective view of a compacting assembly attached to one portion of the bed shaper.

The portion of ground leveler 220 shown in FIG. 5, has a support 230 attached rearward of its leading edge 225. Compacting assembly 267 is mounted to the trailing edge of ground leveler 220 by hinges 268 and 269 thereon secured to mounting frame 270 which has a support member 272 attached to the center portion thereof, and support arms 273 and 274 adjacent to the ends thereof. Axle 271 is mounted on support arms 273 and 274 and yoke 275; which is attached to support member 272. At either end of axle 271, between support arms 273 and 274 and leading yoke 275, are mounted a pair of frustoconical rollers 276 and 277, whose bevel is directed towards leading yoke 275. The frustoconical rollers 276 and 277 are in alignment with plates 261 and 262, respectively, so that they compact the bed formed by the latter.

Following leading yoke 275 and mounted thereto by flexible joints 278 and 279 is a following yoke 280 shaft 282 having arms 283 and 284 in the center thereof which collectively acts as an axle mounting for shaft 281 on which are mounted cylindrical rollers 286 and 287 with flexible joint 289, which is connected to support 285, positioned therebetween. The compacting and leveling effect of rollers 286 and 287 can be varied varying the pressure exerted by these rollers by means (not shown), e.g., by filling them with varying amounts of water or by spring-loading the rollers with respect to yoke 275 so that a portion of the force of the spring is translated into a downward force against the top of the bed.

Cylindrical rollers 286 and 287 can be replaced by a single cylindrical roller extending the length of axle 281 between arms 283 and 284. One compacting assembly 267 is necessary for each pair of bed-forming plates 261 and 262. Thus, the ground leveler 220 shown in FIG. 3 requires two such assemblies.

OPERATING DESCRIPTION

With reference to FIG. 1, in operation all valves are first placed in closed position. A chemically inert gas, such as nitrogen, stored in tank 1, is released into line 3 by opening valve 2. In the preferred embodiment, the water system operates at 50 p.s.i., whereas the gel assembly operates at from about 30 to 40 p.s.i. The pressure differential is maintained by pressure regulators 6 and 10.

The flow of pressurized inert gas to the gel tank assembly is initiated by opening valve 24, which directs the gas through line 29 the pressure being monitored by pressure gauge 28. Gas is introduced into gel tank 49 by opening valve 42. The gelled liquid is passed thru line 47 by opening valve 46. It passes through strainer 52 and line 54 by opening valve 63.

With valve 63 open, gelled liquid passes through line 66 to manifold 60 when the transporting equipment is started in motion valves 71, 81, 91 and 101 are opened, thus discharging gelled liquid from the ends 124, 144, 164 and 184 of lines 75, 85, 95 and 195, respectively.

OPERATION WHEN PARTS OF THE APPARATUS BECOME CLOGGED

During normal operation of the unit, one of gelled liquid dispensing conduits 75, 85, 95 and 195 may become clogged with the gelled liquid. For example if conduit 75 becomes clogged, valve 74 is opened, which creates a venturi action in orifice 79, thereby sucking the clogged material in line 75 back through the orifice into line 73 and through valve 74 and out the said 122 of line 73. Once the clogged material is removed from line 75, valve 74 is closed, thus permitting normal operation to continue without interruption. This venturi and suction action are created by the novel arrangement of valves and orifice within the dispensing assembly.

Should the aspiration technique prove insufficient to clear the clogged lines, water is circulated through manifold 60 and its downstream parts by closing valve 63 and opening valves 22 and 68. Each downstream line can be flushed out individually by opening shutoff valves 71, 81, 91 and 101 in succession. Spent water and any noxious fumes in the gelled liquid are vented below the soil surface by conduits 122, 142, 162 and 182, when valves 74, 84, 94 and 104 are closed and out conduits 124, 144 and 164 and 184, respectively when these valves are opened. The lines are then cleared and dried with pressurized gas by closing valve 68 and opening valve 61 while keeping valve 63 closed. When the lines are cleared, valves 22 and 61 are closed and normal operations are resumed by opening valve 63.

REPLACEMENT OF SPENT GEL CONTAINER

Gelled fumigants are commercially available in large metal cans or cantrix containers. For this reason valves 42, 44 and 46 have been provided. To change a spent canister, all valves are closed. Valve 44 is then opened which vents the air pressure remaining in the container to the soil through lines 55 and 57. Line 57 may be attached to any line projecting below the soil surface convenient to the relative position of gel tank 40 and valve 44, e.g. bypass line 108. Once pressure is relieved, valve 44 is closed and the empty container replaced. Normal operation therewith can then be resumed as described above.

SHUTDOWN PROCEDURE

Depending on the nature of the gelled liquid, it is often desirable if not necessary to remove remaining gel and/or water from the unit prior to storage. To do so, all valves except 6 and 10 are closed. Line strainer 52 is drained by opening valve 50 and venting the remaining material contained therein through lines 53 and 57. Should draining be slow, valves 22, 68, and 63 can be opened to place additional pressure on the contents. When strainer 52 is completely drained, valve 68 is closed and valve 61 is opened in order to blow out the lines with pressurized inert gas. Water can be drained from water tank 39 by opening valves 22 and 39, thereby releasing the water through line 58. Since the water contains no chemicals, the outlet of line 58 need not be placed below the soil surface.

GROUND-FORMING OPERATIONS

With reference to FIGS. 1 and 3, when in operation the ground leveler 220 is displaced rearward to the earthworking tools. As the ground leveler 220 proceeds over the earth, soil is directed by leading edge 225 to the underside of ground leveler 220 and is consolidated into beds or mounds by plates 261, 262, 263 and 264. Springs 233, 243 and 253 compensate for irregularities in the contour of the soil.

What is claimed is:

1. An apparatus suitable for depositing a liquid below the surface of the earth comprising:
    a. a plurality of earthworking tools adapted for penetration of the surface of the earth;
    b. a first container adapted to hold a volume of water;
    c. a second container adapted to hold a volume of a liquid;
    d. a third container adapted to hold a volume of an inert gas under pressure;
    e. a first gas conduit with a shutoff valve therein connecting said third container with said first container at a point above the level of the liquid therein;
    f. a second gas conduit with a shutoff valve therein connecting said gas container with said second container at its upper portion;
    g. a first liquid conduit having a pair of shutoff valves therein connecting said first container with said second container at their lower portions;
    h. a liquid-dispensing conduit and a liquid bypass conduit mounted in pairs rearwardly on said earthworking tools having one end thereof terminating above and proximate the lower end of said earthworking tool, each of said dispensing conduits having a shutoff valve therein positioned above a constricting orifice therein and each of said bypass conduits having a shutoff valve therein, each of said pairs of dispensing bypass conduits being connected above the shutoff valve in the bypass conduit and between the shutoff valve and the orifice in the dispensing conduit, with one end of each of said dispensing conduits being connected above the shutoff valve therein with said first liquid conduit between said pair of shutoff valves therein, said tools and said containers being mounted to support means and adapted to be employed in conjunction with transport means therefor.

2. An apparatus according to claim 1 having bed-forming plates mounted to support means and positioned rearwardly and transversely to each of said earthworking tools.

3. Apparatus according to claim 2, having a pair of frustoconical bed-compacting rollers adjustably mounted to said plate support means rearwardly with respect to said bed-forming plates and having a cylindrical bed-forming roller mounted behind said frustoconical bed-compacting rollers.

4. Apparatus according to claim 1 having a second gas conduit with a shutoff valve therein connecting said third container with said liquid conduit.